Figure 1:
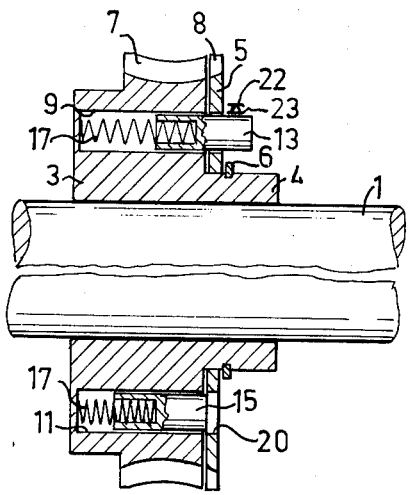

United States Patent [19]
Aberg

[11] 4,055,092
[45] Oct. 25, 1977

[54] SAFETY DEVICE FOR GEAR WHEELS

[76] Inventor: Martin Birger Aberg, 137 Morrison Road, Oakville, Ontario, Canada

[21] Appl. No.: 741,496

[22] Filed: Nov. 12, 1976

[30] Foreign Application Priority Data

Nov. 13, 1975 Sweden .............................. 7512752

[51] Int. Cl.² ...................... F16H 55/12; F16H 55/18; F16H 1/16; F16H 55/00
[52] U.S. Cl. ........................................ 74/439; 74/425; 74/432; 74/440
[58] Field of Search ................... 74/432, 425, 439, 440

[56] References Cited

U.S. PATENT DOCUMENTS

| | | | |
|---|---|---|---|
| 2,767,652 | 10/1956 | Dietrich et al. | 74/440 X |
| 2,928,288 | 3/1960 | Bliss et al. | 74/440 X |
| 2,966,806 | 1/1961 | Luning | 74/440 X |
| 3,127,784 | 4/1964 | O'Neill | 74/440 |
| 3,648,534 | 3/1972 | Fagarazzi | 74/440 |

*Primary Examiner*—Leonard H. Gerin
*Attorney, Agent, or Firm*—Cushman, Darby & Cushman

[57] ABSTRACT

A gear wheel is provided with a safety release disc adjacent one face thereof, said disc having teeth formed as direct extensions of the gear wheel teeth. The disc teeth engage the same gear element as the teeth of the gear wheel but the disc is rotatable on the gear wheel axle. In the event of tooth wear or tooth breakage of the gear wheel the gear wheel will turn relative to the disc, which has no rotational load. This relative movement is utilized to trip signalling or locking devices as desired.

11 Claims, 5 Drawing Figures

U.S. Patent     Oct. 25, 1977     4,055,092

SAFETY DEVICE FOR GEAR WHEELS

The present invention relates to a safety device for a gear wheel, as according to the preamble to the accompanying claim 1.

The purpose of the invention is to provide a safety device in a gear wheel (toothed wheel), so that the gear wheel can be locked if a tooth breaks or when the wear on the teeth exceeds a certain predetermined amount. This prevents the gear wheel from uncontrolled further rotation under the effect of its axle load. Another purpose of the invention is to provide a signalling device which signals when the tooth wear on the gear wheel exceeds a certain predetermined amount. Thus the gear wheel can be replaced at an operationally suitable time, before tooth breakage or breakdown occurs. The invention is especially intended to provide a safety device for a worm gear to a vertically movable door to prevent the door from uncontrollably falling down in the event of tooth breakage.

According to the invention these problems are solved by a safety device which has the characteristics disclosed in claim 1.

According to a preferred embodiment of the invention, the tripping means of the gear wheel/tripping element (release element) are completely mechanical and operate without requiring an external supply of power. Alternately, electrical or magnetic tripping means can be used. A preferred embodiment of purely mechanical tripping means comprises, according to the invention, a spring-loaded pin in a bore in the gear wheel and an opening in the tripping element which releases the pin, or vice versa, which opening lies to one side of the pin bore when the gear teeth are intact but is displaced to a position in front of the pin bore when a tooth is broken or the tooth wear exceeds a predetermined amount. The pin can then pass out through the opening and can directly cooperate with stops, in a suitable manner, so that the rotation of the gear wheel is stopped, actuate a locking mechanism, or actuate a signalling device. The pin can be arranged for radial or axial movement and the opening releasing the pin can be shaped and placed so that tripping occurs in one or both of the directions of rotation of the gear wheel.

A tripping pin of this type can also be used for a secondary operating movement. For example, the inner end of a radially movable pin, as it moves outwardly in the tripping movement, can release a spring loaded axially movable pin which is guided in a coaxial axle bore. The axle pin can be pushed by the spring outside the end of the axle and be used for actuating a locking mechanism, for example.

Figure 2:
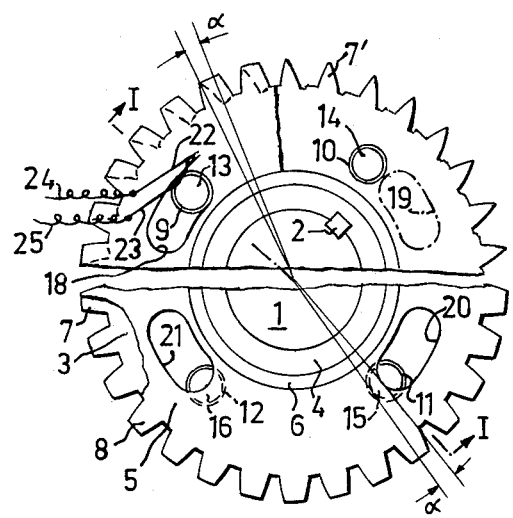

The invention is described in more detail below with reference to the accompanying drawings, in which FIGS. 1 and 2 show a first embodiment of the invention, in axial section along the line I—I in FIG. 2 and from the end, respectively. This first embodiment is in the form of a worm wheel in a worm gear with a worm (not shown) and with a schematically indicated signalling device. The lower portions of the figures show the device in normal operating position with intact teeth and the upper halves of the figures show the device with the safety device tripped.

Figure 3:
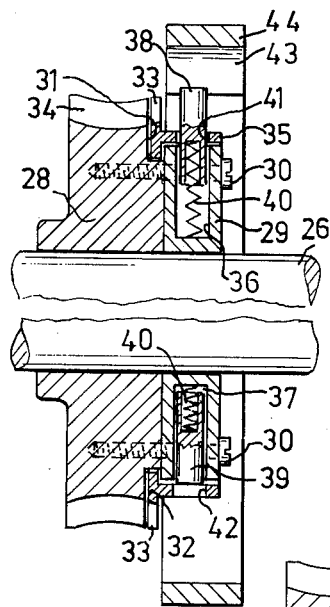
Figure 4:
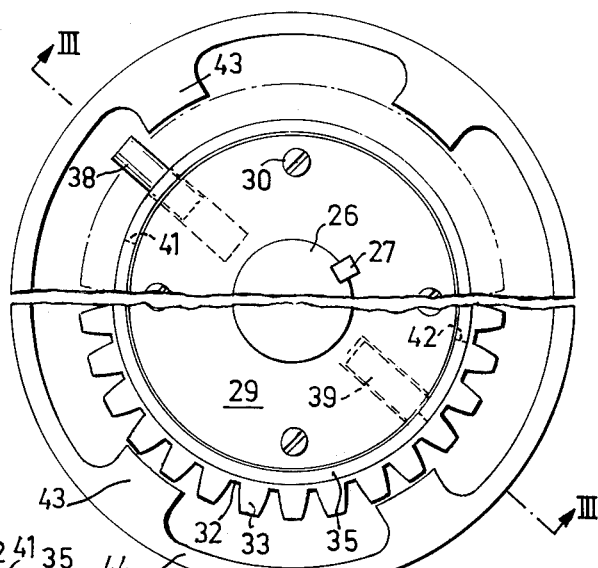
Figure 5:
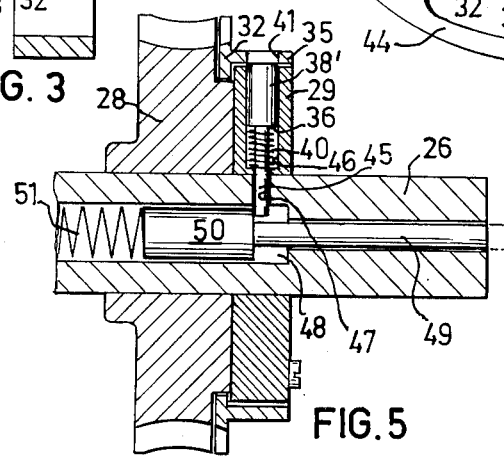

FIGS. 3 and 4 show, in a manner similar to FIGS. 1 and 2, a second embodiment of the invention, likewise of a worm wheel, and FIG. 5 shows an axial section through a third embodiment of the invention in a worm wheel of a worm gear.

The embodiment shown in FIGS. 1 and 2 comprises a worm wheel, connected to an axle 1 via a key 2, in a worm gear whose worm and housing are not shown. The worm wheel 3 has a cylindrical neck 4, on which a disc 5 is freely rotatably journalled. A stop ring 6 on the neck 4 prevents axial movement of the disc 5. The disc 5 has the same outside diameter as the worm gear wheel 3. When manufacturing the teeth 7 of the worm wheel 3, the disc 5 is held abutting the worm wheel 3, so that the disc 5 is also provided with teeth 8, formed as a direct lateral extension of the teeth 7 of the worm wheel. The lower portion of FIG. 2, showing the normal operating position of the safety device, illustrates that the teeth 8 of the disc 5 have the same shape as the teeth 7 of the worm wheel 3 and are aligned therewith.

The worm wheel 3 is provided with four axial blind bores 9, 10, 11 and 12 located at the same diameter, which opens towards the disc 5. Each bore slidably guides one of four cylindrical pins 13, 14, 15 and 16, respectively, and a cylindrical pressure spring 17 is tensioned between the pin and the bottom of the blind bore. In the normal operating state, i.e. when the teeth 7 of the worm wheel 3 are intact, the disc 5 prevents the pins 13–16 from being pushed out of the bores 9–12. The right-hand ends of the pins (according to FIG. 1) will then rest against the left-hand side of the disc 5 under the influence of the springs 17.

At the same diameter as the pins 13–16, the disc 5 is provided with four bow-shaped openings 18, 19, 20 and 21, respectively, which have a radial width somewhat exceeding the diameter of the pins and a length along the arc which substantially exceeds the diameter of the pins.

The lower portions of FIGS. 1 and 2 show the normal operating state of the worm wheel 3 and the disc 5, in which the teeth 7 and 8 are located directly in front of one another. This relative position is maintained when the worm wheel 3 rotates during operation, since the worm also drives the disc 5 synchronically with the worm wheel 3. If, however, one of the teeth 7 of the worm wheel 3 should break off, the worm wheel 3, whose axle is torsionally loaded by, for example, a wire drum of a vertically movable door, will rotate in relation to the disc 5, which is not loaded and remains in engagement with the worm. This relative rotary movement between the worm wheel 3 and the disc 5 results in one of the two pairs of pins 13/15 and 14/16 (depending on the direction of rotation) ending up within the outer contours of the corresponding openings 18/20 or 19/21 respectively in the disc 5 so that the pair of pins in question can be axially pushed out by the force of the springs 17.

As is evident from the lower portion of FIG. 2, the opening 20 of the disc 5 is turned counter-clockwise relative to the bore 11 of the worm wheel 3, while the opening 21 is angularly displaced clockwise in relation to the bore 12 of the worm wheel. The same is true for the positions between opening 18 and bore 9, and opening 19 and bore 10, which are not shown in the position they occupy when the worm wheel 3 is intact. With this alternating arrangement, when there is a tooth break or wearing of the teeth of the worm wheel 3, the worm wheel 3, when the load on its axle 1 acts counter-clockwise, will be turned relative to the disc 5 so that the bores 9 and 11 are turned in such a way as to come into the areas of the openings 18 and 20 respectively, so that the pins 13 and 15 can be pushed out.

When the load on the worm wheel axle 1 is clockwise, the bores 10 and 12 are turned under the areas of the openings 19 and 21 respectively so that the pins 14 and 16 can be pushed out. The openings 18–21 are extended along the arc to assure that the pins will have enough time to push out through the respective openings, even if the worm wheel 3 accelerates greatly when a tooth breaks.

When the safety device is to be actuated to give warning when a certain amount of tooth wear has been reached, the degree of tooth wear at which the warning signal is to be given is predetermined by the appropriate selection of the relative positions between the bores 9–12 and pins 13–16 of the worm wheel 3 and the openings 18–21 in the disc 5. The upper portion of FIG. 2 shows heavily worn teeth 7' on the worm wheel 3. The left-hand sides (in the drawing) of the teeth 7' have been worn away under the influence of counter-clockwise torsional load on the axle 1. In this case a warning signal is desired when the teeth 7 have been worn down so much that the flat tops of the teeth have just disappeared, which corresponds to a rotation angle α. To obtain a signal in this position, the positions of the openings 18 and 20 in the disc 5 are chosen so that their rear (in the counter-clockwise direction) edges lie at the same angle α in front of the rear (in the counter-clockwise direction) edges of the pins 13 and 15 respectively. When the teeth 7 are being worn, the worm wheel 3 under the effect of the axle 1 load will be turned counter-clockwise in relation to the unloaded disc 5, since the teeth 7,7' of the worm wheel 3 as well as the teeth 8 of the disc 5 engage the same worm (not shown). When the wear on the teeth 7' has become so great that the gear wheel 3 has rotated the angle α in relation to the disc 5, the pins 13,15 are released through the openings 18,20 and can thereby actuate a signalling device.

The locking or signalling device can be designed in a number of ways within the scope of the invention. FIGS. 1 and 2 show schematically an embodiment of a signalling device comprising a fixed metal contact strip 22 and a movable metal contact strip 23 extending tangentially into the pitch circle of the pins 13–16 to one side of the disc 5. The metal contact strips 22,23 are connected via wires 24,25 to an electrical alarm circuit (not shown in more detail here). When the teeth are intact in the worm wheel 3, the pins 13–16 lie in their bores 9–12, and the movable metal contact strip 23, under its own spring action, is swung towards the center of the axle 1 so that it does not touch the fixed metal contact strip 22. When one of the pins 13–16 has been released, it extends axially past the contact strips 22 and 23 and when the worm wheel 3 rotates in relation to the contact strips 22,23, which do not rotate, the pin 13, as is shown in the upper portions of FIGS. 1 and 2, will press the movable contact strip 23 up against the fixed contact strip 22 so that the wires 24 and 25 are electrically connected to one another. The contact strip 23 is constructed so that it can be acted on in both directions of rotation.

FIGS. 3 and 4 show a second embodiment of a safety device according to the invention, which also operates mechanically but has radially movable locking pins. A worm wheel 28 in a worm gear is fixed on an axle 26 by means of a key 27. The worm is not shown. A pin disc 29 is located axially to one side of the worm wheel 28 and is attached to the same with the help of screws 30.

The worm wheel 28 is provided with a groove 31 adjacent the pin disc 29, in which a ring 32 is freely rotatable but axially immovable. The ring 32 is provided with an outer rim of teeth 33 shaped in correspondence with the teeth 34 of the worm wheel 28. The ring 32 also has an axial collar 35 which is located adjacent the peripheral surface of the pin disc 29.

The pin disc 29 is provided with two opposing radial blind bores 36,37 which open into the peripheral surface of the disc 29. Locking pins 38,39 are slidably guided each in an individual blind bore 36 and 37, respectively, and are acted on radially outwards by a spring 40 tensioned between the pin and the bottom of the bore. The ring collar 35 is provided with two diametrically opposed openings 41 and 42, respectively, whose axial dimension is somewhat larger than the diameter of the pin 38,39 and whose length along the arc is appreciably greater than the diameter of the pins 38,39.

The lower portions of FIGS. 3 and 4 show the safety device in the position which it assumes when the teeth 34 of the worm wheel 28 are intact. The opening 42 of the ring collar 35 is here only partially in front of the pin 39 so that the collar prevents the pin from being pushed out radially under the effect of the spring 37. If there is tooth breakage or tooth wear in the worm wheel 28 there will be a relative angular movement between the worm wheel 28 and the ring 32 in the same manner as described in connection with FIGS. 1 and 2. The ring 32 with the collar 35 will assume a position in relation to the worm wheel 28 as shown in the upper portions of FIGS. 3 and 4. The pin 38 has come into the area of the opening 41 and has been pushed out by the spring 40. In this position the pin 38 extends in between a number of fixed blocking stops 43, arranged, for example, extending radially inward from the worm gear housing 44. Under the influence of the load on the axle 26, acting counter-clockwise in this example, the radially extending pins 38,39 after at most one quarter of one rotation will hit the blocking stops 43, thereby stopping the rotation of the worm wheel 28.

The embodiment according to FIGS. 3 and 4 could also be provided with a signalling device similar to that shown in FIGS. 1 and 2. Conversely the embodiment according to FIGS. 1 and 2 can be provided with a locking device corresponding to that according to FIGS. 3 and 4 in which, for example, the blocking stops project axially inward from an end wall of the worm gear housing.

It is also possible to provide a locking device with a pin or a set of pins which is released at a predetermined smaller angular displacement between the gear wheel and the pin locking element functioning as a tripping element, thereby actuating a signalling device to indicate that a predetermined degree of tooth wear has been reached. A second set of pins is released at a greater angular displacement between the gear wheel and the tripping element as a result of tooth breakage and cooperates directly with a locking device which locks the gear wheel.

Thus the safety device according to the invention is to be seen as a tripping device, by means of which an arbitrary blocking or signalling device can be actuated. According to the invention, it is also possible to allow the tripping device to perform a number of operating movements. An example of this is explained below in connection with FIG. 5.

FIG. 5 shows, in a similar manner to FIG. 3, a safety device with radially movable blocking pins. The same reference numerals have been used in FIG. 5 for those parts which have counterparts in FIG. 3. In contrast to the embodiment according to FIG. 3, in the embodiment according to FIG. 5 the blocking pin 38' is provided with a radially inwardly directed extension 45 of smaller diameter. The extension 45 extends through an opening 46 in the bottom of the blind bore 36 and continues in a radial bore 47 in the axle 26. The inner end of the extension 45 of the pin 38' extends into the wider section of an axial step bore 48 in the axle 26. The narrower section of the bore 48 extends to the end of the axle 26. In the bore 48 there is an axially slidably guided pin, the narrower portion 49 of which runs in the narrower section of the bore and the wider portion 50 of which runs in the wider section of the bore 48. In the position shown in FIG. 5 a spring 51 tensioned between the bottom of the bore 48 and the pin portion 50 presses the ring surface formed between the pin portions 49 and 50 against the inner end of the radial pin extension 45. Tooth wear or tooth breakage trips the safety device so that the spring 40 pushes the pin 38' outwards through the opening 41 in the ring collar 35. This draws the pin extension 45 radially out of the axial bore 48 in the axle 26 thereby releasing the axial pin 49,50. The spring 51 pushes the end of the thinner pin portion 49 out of the axle 26. This operating movement can then be used as desired to actuate a locking or signalling device.

The embodiments described above relate to worm wheels in worm gears, but the invention is not limited solely to this type of gear wheels. The invention can also be used in other types of gear wheels, also with axial teeth as well as with toothed wheels cooperating with chains.

As an alternative to the axially stationary tripping element described above, it is also possible to allow the tripping element to perform axial operating movements. In an embodiment with a toothed disc, which is thin in relation to the gear wheel and similar to disc 5 according to FIGS. 1 and 2, axially spring loaded pins, for example, or interacting cams in the gear wheel and the disc can cause the disc to move axially when there is relative rotation between the gear wheel and the disc. This axial movement of the disc can then be used to actuate an arbitrary locking or signalling mechanism; or the disc, like a claw coupling, can interact directly with fixed stops and at the same time be connected via a cam to the gear wheel, thus stopping the same.

Furthermore, in the embodiments described above, the tripping (or release) element is rotatable around the axis of rotation of the gear wheel, and also directly engages the gear element in engagement with the gear wheel. These two design features provide a simple construction, especially for the means sensing the relative motion. Alternatively, however, the tripping element can rotate around an axis at an angle to the axis of the gear wheel and/or engage an element which moves synchronically with the gear element.

What I claim is:

1. A safety device for use with a toothed wheel structure whose teeth engage a toothed element arranged to trip a protection device when a tooth of the toothed wheel structure is broken or when there is a predetermined amount of tooth wear, characterized in that the device comprises a tripping element mounted so as to be rotatable relative to said toothed wheel structure said tripping element having a rim of teeth with the same pitch as the teeth of said toothed wheel structure so that the teeth of said tripping element also engage the toothed element or an element synchronically movable therewith, and signalling means responsive to relative rotary movement between said tripping element and said toothed wheel structure for tripping a protection device when there is rotary movement between said tripping element and said toothed wheel structure beyond a given angle.

2. A device according to claim 1, characterized in that the tripping element at a first predetermined angle of rotation relative to the toothed wheel trips a signalling device and at a second predetermined angle of rotation relative to the toothed wheel, greater than the first-mentioned relative angle of rotation, trips a locking device.

3. A device according to claim 1 wherein said tripping element is rotatable around the axis of rotation of said toothed wheel structure, and that the teeth of said tripping element are arranged beside the rim of teeth of said toothed wheel structure as lateral extensions of the teeth of said toothed wheel structure.

4. A device according to claim 3 wherein said tripping element comprises a disc positioned parallel to said toothed wheel structure and having the same diameter as said toothed wheel structure.

5. A device according to claim 4, wherein said protection means comprises arrangements which, when there is a relative movement between the toothed wheel and the disc, causes the disc to move axially in relation to the toothed wheel, so that the disc is thereby brought into direct interaction with a stop means and with the toothed wheel, or is made to influence a locking mechanism or signalling device.

6. A device according to claim 3 wherein said signalling means comprises at least one means defining a bore in said toothed wheel structure, said bore having a pin located therein said pin being acted upon by a spring, said tripping element having at least one means defining an opening extending therethrough, said tripping element and said opening being positioned with respect to said bore and said pin when said tripping element is in a first angular position relative to said toothed wheel structure such that at least a part of said bore and said pin are not in alignment with said opening so that said pin is retained in said bore against the force of said spring and that when said tripping element is in a second angular position relative to said toothed wheel structure said opening is aligned with said bore and said pin so that said pin extends through said opening under the force of said spring whereby that portion of said pin extending through said opening is positioned so as to engage said protection device.

7. A device according to claim 6 wherein said bore runs parallel to the axis of said toothed wheel structure.

8. A device according to claim 6 wherein said tripping element comprises a cylindrical ring whose axis is coaxial with the axis of said toothed wheel structure said bore extending in a direction radially thereto in which a radial tripping pin is located.

9. A device according to claim 8 wherein the axle of said toothed wheel structure has an axial bore with an axle pin slidably retained therein and a spring axially acting on said axle pin, a radial tripping pin having an inner end extending through a radial axle bore within said axial bore whereby when said tripping pin is in a first pushed-in position the inner end thereof locks said axle pin in a position in which its spring is tensioned and when said tripping pin is in a second pushed out tripped position said axle pin is released so that said axle pin is displaced axially under the influence of said spring.

10. A device according to claim 6 wherein said opening of said tripping element has a portion corresponding to the size of the opening of said bore and a portion extending therefrom in the direction opposite to the direction of the load acting on the teeth of said toothed wheel structure.

11. A device according to claim 6 wherein said protection device comprises a ring spaced from and extending around said toothed wheel structure said ring having a plurality of stop members thereon directed toward said toothed wheel which will engage said pin when extended beyond the confines of said bore so as to stop further rotation of said toothed wheel structure.

* * * * *